United States Patent [19]

Varkala

[11] Patent Number: 4,753,426

[45] Date of Patent: Jun. 28, 1988

[54] TIGHTENING AND CLAMPING DEVICE

[76] Inventor: Christian J. Varkala, 131 Llewellyn Rd., Montclair, N.J. 07042

[21] Appl. No.: 880,156

[22] Filed: Jun. 30, 1986

[51] Int. Cl.[4] .................................... B23Q 1/00

[52] U.S. Cl. .................................... 269/53; 269/42; 269/43; 254/11

[58] Field of Search .................................... 269/41–43, 269/53, 58; 254/11, 217, 218, 213; 24/68 CD, 68 CT

[56] References Cited

U.S. PATENT DOCUMENTS

| | | | |
|---|---|---|---|
| 523,974 | 8/1894 | Courtney | 269/53 |
| 710,169 | 9/1902 | Tretsven . | |
| 1,606,898 | 11/1926 | Robinson | 269/58 |
| 3,152,787 | 10/1964 | Timmons . | |
| 4,027,866 | 6/1977 | Ruggiero | 269/41 |
| 4,505,011 | 3/1985 | Dupuy | 269/41 |

FOREIGN PATENT DOCUMENTS

| | | | |
|---|---|---|---|
| 1138558 | 6/1957 | France | 269/53 |

*Primary Examiner*—Frederick R. Schmidt
*Assistant Examiner*—Judy J. Hartman
*Attorney, Agent, or Firm*—Cushman, Darby & Cushman

[57] ABSTRACT

A device for tightening joints of a wooden type includes a first force transmitting structure and a second force transmitting structure with an assembly for applying force connected therebetween. The force transmitting structure includes a rigid member having a front end portion, a rear end portion and an elongated penetrating portion extending away from the rear end portion. The penetrating portion has a sharpened end and a force applying surface which extends between the sharpened end and the rear end portion. The rear end portion has a striking surface for receiving a hammer blow, a stop surface for limiting the penetration of the penetrating portion into the member, and a lifting surface for applying a lever force to lift the structure from the member. The front end portion has force transmitting surface which couples to the force applying assembly, and an abutment surface for limiting movement of the front end as a result of the force transmittal.

9 Claims, 3 Drawing Sheets

FIG. 1
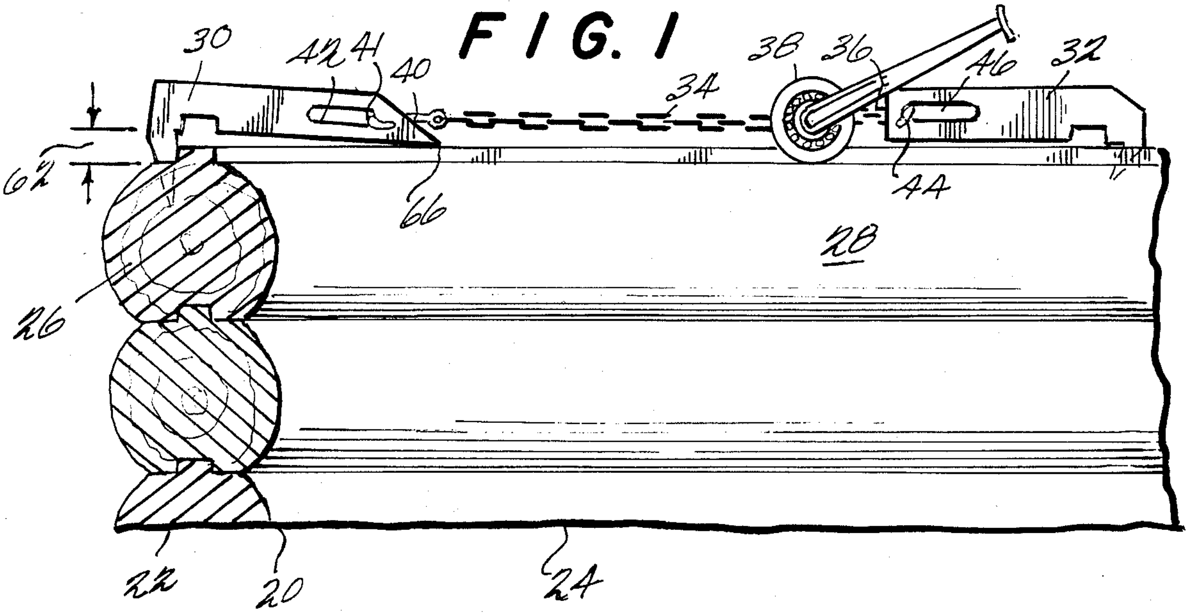
FIG. 2
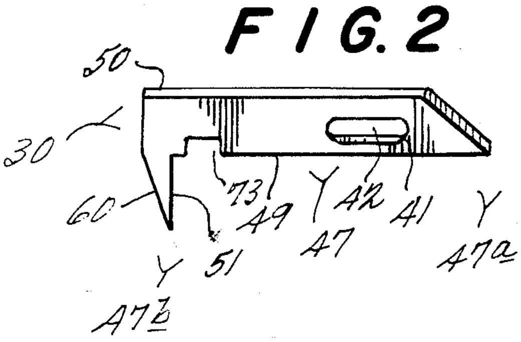
FIG. 3
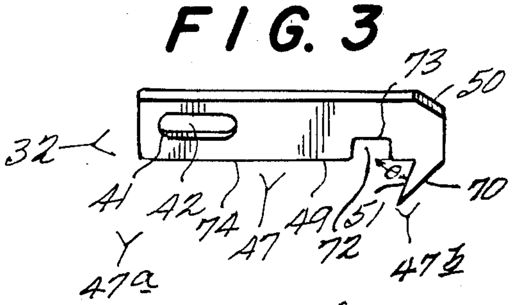
FIG. 4
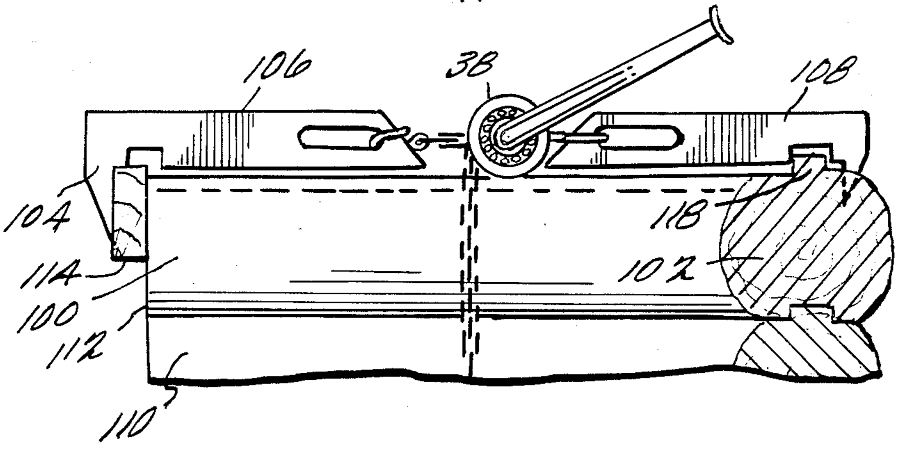
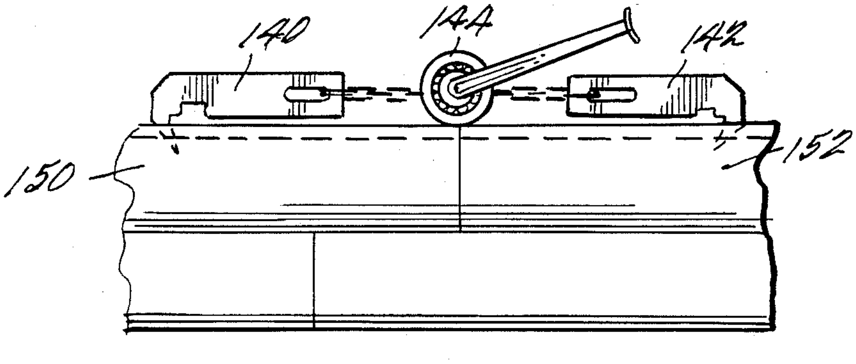
FIG. 6

TIGHTENING AND CLAMPING DEVICE

FIELD OF THE INVENTION

This invention relates to a tightening and clamping device. More specifically, this device allows wooden logs or boards to be tightly clamped to one another during the construction process so that extremely tight joints can be made.

BACKGROUND OF THE INVENTION

Even though we have entered the space age, homes made of wood are still extremely popular. As part of the DIY (do-it-yourself) "fad", a popular part time occupation has become building one's own house, either from commercially available building materials, or from logs of wood. A special problem exists in that in any wooden structure, corners and joints are the most critical parts of integrity of the structure. A loosely joined joint can allow significant leaks of air and water to enter a house with the resulting increase in cost of maintenance and decrease in desirability of living conditions. The quality of construction of corners and joints largely depends upon the skill and experience of the builder constructing these joints. Thus, the average do-it-yourselfer attempting to build a house does not have sufficient experience and skill to expertly craft the energy-efficient and structurally sound house of one's dreams.

Added to this complication is the fact that in log homes typically large timbers are used in the construction. The precise maneuvering of these large timbers can be accomplished, if at all, only with a great amount of difficulty. Thus, even the most experienced carpenter will have problems in constructing a uniformly tight joint. This has resulted in the prior art in the quality of corners and joints being non-uniform.

This invention provides a solution to this problem on any structure made of a wooden type material. This wooden type material can be wood or any other porous type substance which can be nailed into in order to obtain holding power. Although the invention is described with reference to log homes, it is also equally applicable to post and beam structures, frame houses, barns and other building, boats, ships, barges, dams, docks, floors, etc. Any structure made of a wooden type material requires tight joints, and the present invention provides a structure which enables tight joints in an advantageous way.

There have been proposed solutions to this problem in the prior art. U.S. Pat. No. 3,152,787 attempts to provide one such solution. This patent teaches a conventional electric motor coupled to a plate which has curved spikes thereon. When this electric motor is turned on, the plate including the curved spikes can be moved closer to this electric motor. Thus, by driving the spikes into a floor board and operating this electric motor, the floor boards can be moved up against one another. However, there are many problems in this prior art. A first problem is that using an electric motor, precise control of the device is not possible. In addition, referring to FIG. 6 of U.S. Pat. No. 3,152,787, it can be seen that these spikes are located at angles in opposing directions. Thus, a difficulty in both inserting this device into the floor board, and removing this device from the floor board after use would be encountered. In addition, the other end of the device taught by the '787 patent is an angle iron 10 which must be abutted against a three-dimensional corner. Therefore, this device would be useless on a totally flat surface with no corners.

Another proposed solution from the year 1902 can be found in U.S. Pat. No. 701,169. This patent teaches a similar device to that taught by '787—that is a floor jack with a spike on one end for contacting the floor. The '169 patent uses a rack and pinion type ratcheting mechanism to move the spike—thus moving the board into which the spike has been affixed.

However, what has been missing from the art is a relatively simple tightening and clamping device which can be used to move heavy loads such as will exist in building a log cabin—and yet is relatively simple and inexpensive to make, and can be easily used by a non-professional.

SUMMARY OF THE INVENTION

To solve these problems, the present invention teaches a device for tightening joints such as a mitre or a butt joint between two relatively large members of wood or the like such as logs. This invention includes a first force transmitting structure which engages one of the members and a second force transmitting structure which engages the other member. A force applying assembly is connected between the two force transmitting structures to apply forces thereto causing the first and second force transmitting structures to move towards one another thereby tightening the joint.

Each of the force transmitting structures are formed of an elongated rigid member having a front end portion, a rear end portion and an elongated penetrating portion extending away from the rear end portion. The penetrating portion has a sharpened end and a force applying surface. This force applying surface extends from the sharpened end to the rear end portion of the elongated member and faces in a direction towards the front end portion of the member.

The rear end portion has a striking surface which faces in a direction opposed to the direction of penetration of the penetrating portion. This striking surface is adapted to receive the blows of a hammer or the like which thereby causes the penetrating portion to penetrate a member. The rear end also includes stop surface means which faces in a direction towards the penetrating portion and which engages the member penetrated to limit the penetration of the penetrating portion. Also, a lifting surface is provided which faces in the same general direction as the stop surface means and is spaced therefrom in a direction away from the penetrating portion the lifting surface receives a lever applied force sufficient thereto in order to move the rigid member in an opposite direction to the direction of penetration of the penetrating portion. Therefore, when a sufficient lever applied force is applied to this lifting surface, the penetrating portion is lifted out of the member.

The front end portion has a force transmitting surface which couples to the force applying assembly to thereby transmit a force applied by the force applying assembly to the front end portion of the elongated rigid member. In this manner, force is applied to the rear end portion and to the penetrating portion for application to the member penetrated by the penetrating portion. The front end portion also has an abutment surface means which engages the member penetrated by the penetrating portion and limits movement of the front end portion in a direction towards the member as a result of the transmittal of force through the force transmitting surface.

DESCRIPTION OF THE DRAWINGS

An exemplary and presently preferred embodiment of the invention will be described in detail with reference to the accompanying drawings, wherein:

FIG. 1 shows a first embodiment of the invention as placed for use;

FIG. 2 is a detailed drawing of the first plate shown in FIG. 1;

FIG. 3 is a detailed drawing of the second plate shown in FIG. 1;

FIG. 4 is a drawing of an alternative way to engage the first plate with a structure;

FIG. 6 shows the embodiment as used to secure a butt joint;

DESCRIPTION OF THE PREFERRED EMBODIMENT

Figure 7:
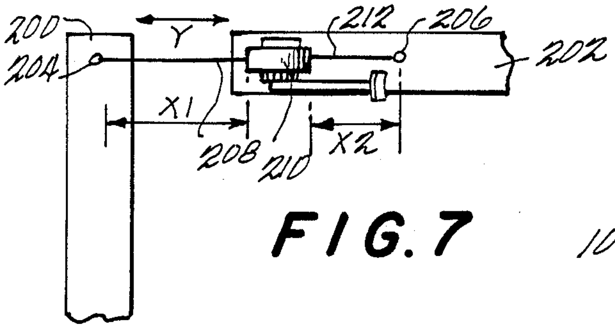
FIGS. 7 and 8 show schematically the operation of the present invention in causing two boards to be closer together.

Referring to FIG. 1, a typical application of a first embodiment of the present invention is shown. A corner joint 20 between walls 22 and 24 is being built in FIG. 1. With the invention as depicted, logs or members 26 and 28 are being prepared for joining.

This first embodiment includes two force transmitting means, a first, long spiked plate 30 and a second, short spiked plate 32 joined respectively by chain 34 and chain 36. Chains 34 and 36 are each connected by means for causing tension 38. Tension causing means 38 can typically be a "come-along" as is depicted in FIG. 1. Alternatively, tension could be produced by ropes and pulleys or a lever type mechanism or any similar structure.

Chain 34 terminates in hook 40 which is attached to a force transmitting surface means 41, which is a front most surface of an opening 42 which is formed in first plate 30. Chain 36 ends in hook 44 which is similarly hooked into opening 46 in second plate 32. Thus, the resultant force of increasing the tension on the chains 34 and 36 is to cause first and second plates 30 and 32 to more closely approach one another—thereby resulting in logs 26 and 28 being rigidly held together as tightly as desired. Thus, corner joint 20 can also be made as tight as desired.

Referring to FIG. 2, a detailed drawing of the first force transmitting means, long-spiked plate 30 is shown. Long-spiked plate 30 is formed of an elongated, rigid member 47 having a front end 47*a* and a rear end 47*b*. An elongated, driveable or penetrating sharpened end, or spike 60 extends away from the rear end of the body of the plate in the direction of penetration. This spike 60 is typically approximately 2–4, preferably 3, inches in length and forms an angle $\alpha$ with a bottom surface of the plate of less than 90°. An opening 42 is also formed in the plate to facilitate attachment to a means for causing tension. As shown in FIG. 1, long-spiked plate 30 is specially optimized to be either partially or completely driven into a wooden type material. A stop surface 49 is provided, but a space 62 between stop surface 49 and log 26 is left in normal operation. Thus, as a result, stop surface 49 is not flatly abutted against log 26 or log 28. In normal operation, log 28 is contacted by first plate 30 only at front contact surface means 66. In the event the plate is completely driven into log 28, a notch is provided for easy removal as described herein. A striking surface means 41 is located opposed to the sharpened edge to facilitate the force transmitting means 30 being firmly imbedded in a log. Once plate 30 is firmly imbedded in the log, and force is applied to force transmitting surface means 41, this force is transmitted to log 26 by force applying surface means 51.

Referring to FIG. 3, a close-up view of short-spiked plate 32 is seen. The same numerals are used in FIG. 3 as in FIG. 2 to indicate same surfaces. However, the elongated sharpened end (or spike) 70 is shorter than in FIG. 2, and at a smaller angle with stop surface 49. Also, a notch 72 is formed in the stop surface 49. Notch 72 provides a surface 73 which faces in the same general direction as the stop surface 79 and is spaced therefrom in a direction away from the penetrating portion 60. Surface 73 is used as a lifting surface means to allow a crowbar or other such lever mechanism to get between short-spiked plate 32 and log 28 for facilitated removal thereof.

Spike 70 is less than 2 inches long, and preferably 1½ inch long, and forms an angle $\theta$ of approximately 60° or less with bottom line 74 of body 47. This 60° angle is desirable because, as shown in FIG. 1, short-spiked plate 32 is optimized so that spike 70 is hammered all the way into log 28. Thus, in contrast to the long-spiked plate 30, short-spiked plate 30 when fully inserted lays flat on log 28, contacting log 28 substantially all along bottom surface 74. However, if short-spiked plate 32 is not fully inserted into log 28, the angle $\theta$ ensures that as more tension is impressed on chain 36, spike 70 will be further impressed into log 28. Thus, as force is applied to short-spiked plate 32 by means for causing tension 38, spike 70 will be forced further into log 28 until it is fully embedded therein. Thus, the danger of partial insertion leading to possible subsequent decoupling is minimized. This is especially important in a device such as this where the means for causing tension will typically have a rated force of upwards of half a ton. Thus, with a half a ton of tension on the chains, a plate coming uncoupled from one of the logs could have lethal results. The design of the present invention ensures a safe hold as both plates dig deeper into the wood substrate with increasing pressure.

Referring to FIG. 4, an alternate method of mounting the present invention to provide tension between two logs is shown. In the embodiment shown in FIG. 4, logs 100 and 102 are desired to be abutted against one another. However, as is typical in building log homes, logs 100 and 102 are formed of the "tongue and groove" type. Thus, a problem exists in that it would be disadvantageous to nail spike 104 directly into tongue 118. This could cause deformation of tongue 118 which could create problems of fitting the next course above this course. Thus, it can be seen that the solution to this problem is to use an alternative form of the present invention which includes means for creating tension 38 along with two long-spiked plates, left plate 106 and right plate 108.

Wall 110 ends at end 112. Against this end 112 is placed scrap wood 114. Spike 104 is abutted against scrap wood 114. Thus, the force applied to left plate 106 is transmitted to scrap wood 114 to avoid damaging the exposed end 112 of wall 110. Right plate 108 is driven into log 102 similar to the way described with reference to the first plate of FIG. 1. However, care must be taken that plate 108 is driven at a point other than where tongue 118 is located. Since the force must be applied to substantially the geometric center of each log, were it not for this advantageous feature of the first plate of being able to hold the wall without being driven into the wall, it would be required to nail into the tongue with possibly harmful results. However, long spike 104 can hold wall 110 in place while log 100 is affixed to log 102. Thus, these logs can be pulled into tight registry with one another in order for permanent affixation without in any way disturbing the tongues which are formed on their respective top surfaces. FIG. 4 also refers to a situation in which log 100 is too short to use second Plate 32 FIG. 3.

Figure 5:
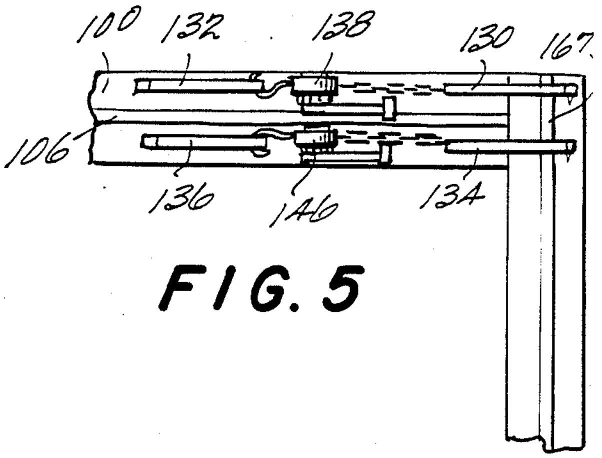
FIG. 5 shows an alternative embodiment as used to secure a butt joint; or corner

However, it is inevitable that in building such a structure, a location where an end wall such as described with reference to FIG. 4 cannot easily be utilized for the above referenced purpose will be encountered. In such a case, the technique depicted in FIG. 5 can be utilized. In FIG. 5, two of the tightening and clamping devices are used. A first device includes first plate 130 and second plate 132, the second device includes first plate 134 and second plate 136. Two means for causing tension 138 and 140 are also provided. The two second plates, 132 and 136, are respectively located on both sides of tongue 106. Thus, although second plates 136 and 132 must be nailed into top surface of log 100, they are located in a non critical portion of log 100—that is a portion where the tongue is not raised. Since the tongue is located in the middle of log 100, two sets of apparatus are necessary, because the apparatus is not located so as to apply force to the center of the log. Thus, first device and second device roughly offset each other in force, with the result in force equivalent to the force that would be applied by one device centered on log 100. The first plates, 130 and 134 are similarly not nailed into tongue 107.

Referring to FIG. 6, the device as used to form a butt joint is shown. The device as configured in FIG. 6 includes two short spiked plates 140 and 142, with means for causing tension 144 attached between them. Plate 140 is nailed into log 150 and plate 142 is nailed into log 152. Thus, by increasing the tension, logs 150 and 152 can be caused to form a tight joint in preparation for final attachment together.

The system shown in FIG. 6 can also be modified as shown in FIG. 4 or FIG. 5 for use on a tongue and groove board.

Figure 8:
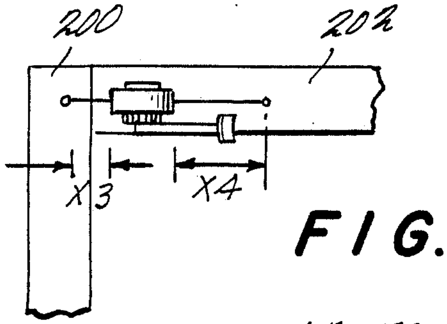

Referring to FIGS. 7 and 8, a schematic type representation of the tightening and clamping device and its action is shown. In FIG. 7, logs 200 and 202 are desired to be joined in a corner type joint. A first plate 204 is affixed into log 200, and a second plate 206 is affixed to log 202. A chain 208 is affixed between 204 and means for causing tension 210. Chain 212 is similarly affixed between plate 206 and means for causing tension 210.

As originally situated, log 202 is separated from log 200 by a space labelled Y in FIG. 7. Also the length of chain 208 is originally referred to as X1—with the length of chain 212 being originally X2. As the logs are desired to be moved closer to one another, means for causing tension 210 shortens the length of chains 208 and 212. This assumes that means for causing tension 210 is a come along or turnbuckle or the like which shortens the length of both chains which are attached thereto. Depending upon the application, this could equally likely be a device such as a pulley or a ratchet type tensioning device which shortens the length of only one of the chains.

In either situation, as the length of chains 208 and 212 are shortened, log 202 is moved closer to log 200. FIG. 8 shows the final result of such operation. In FIG. 8, log 202 is tightly abutted against log 200 and chain 208 has been shortened to a length X3 while chain 212 has been shortened to a length X4. In this final position in tight abutment of logs 200 and 202, these logs will typically be permanently affixed either to one another or to the underlying or overlying substrate to permanently hold them in position. Thus, a tight joint will be formed.

Figure 9:
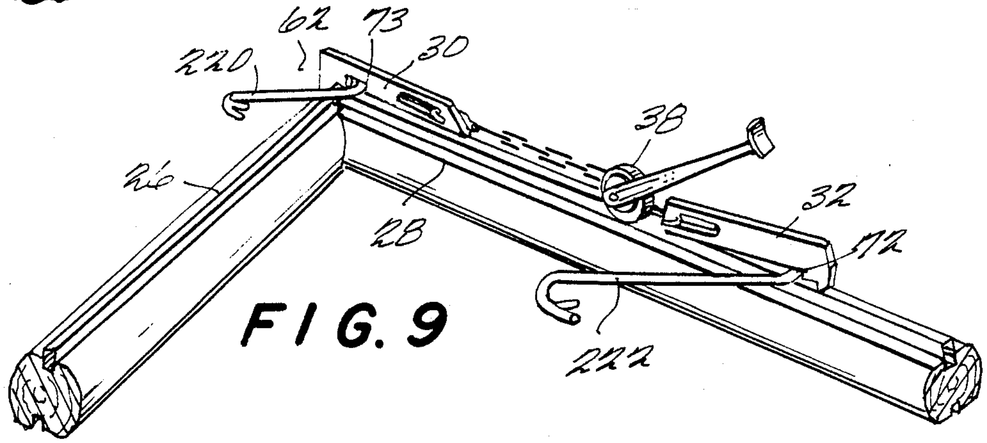
FIG. 9 shows the technique of removing the present invention from the boards once they are secured together.

Referring to FIG. 9, the embodiment shown in FIG. 1 is depicted with first plate 30, second plate 32 and means for causing tension 38. In FIG. 9, however, logs 26 and 28 have been permanently affixed together, and it is desired at this point to remove the clamping device from these logs. To remove a plate of the type of first plate 30, crowbar 220 is inserted as shown in FIG. 9 into slot 62 so that the end portion of crowbar 220 abuts against lifting surface 73 of first plate 30. Then, the curved portion of crowbar 220 is rested against a top surface of log 28 or log 26 which is used for leverage. The end of crowbar 220 is then pushed in an appropriate direction to apply force to lifting surface 73 of first plate 30. With this force applied, the lever action of the crowbar will cause first plate 30 to be removed from log 26.

Alternatively, due to the angle of spikes 60 and 70, by hitting first or second plate 30 or 32 with a hammer or other suitable blunt object, in an appropriate direction, first plate 30 or second plate 32 can be made to withdraw from the wood. It should be noted that this hitting action must be in a direction opposite to the direction of which force is applied to second plate 32. As discussed above with respect to FIGS. 1–6, force in the direction of which force is applied by the clamping device causes second plate 32 to be more deeply embedded into log 28. Thus, force in the opposite direction causes second plate 32 to be disgorged.

To remove either first plate 30 or second plate 32, crowbar 222 is inserted into slot 72 in either plate against lifting surface 73. Slot 72 is specially optimized for use with the crowbar, and the lever action of crowbar 222 will allow relatively easy withdrawal of either plate from the log substrate.

Figure 10A:
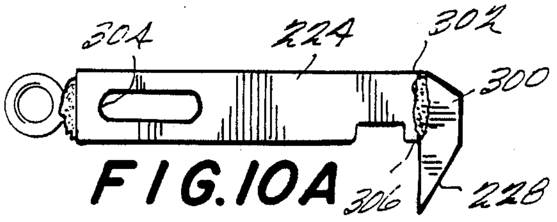
FIG. 10 depicts an alternate construction of the plates.
Figure 10:
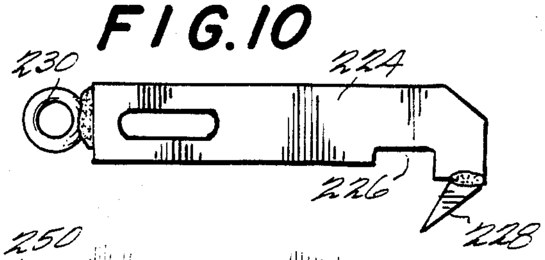

Alternatively, either plate could be constructed as shown in FIG. 10. Plate 224 is generally rectangular, with a notch 226 formed in a lower portion. Spike 228 and ring 230 are welded to body 224 to form a structure identical in function to those described with reference to FIGS. 2 and 3.

An alternate construction of the plates according the present invention is depicted in FIG. 10A. In this second alternate construction, the generally rectangular plate 224 is welded to an end portion 300. This end portion 300 includes striking surface 302 as well as spike 228. Rectangular portion 224 includes prying notch 226, and force transmitting surface means 304.

Figure 11:
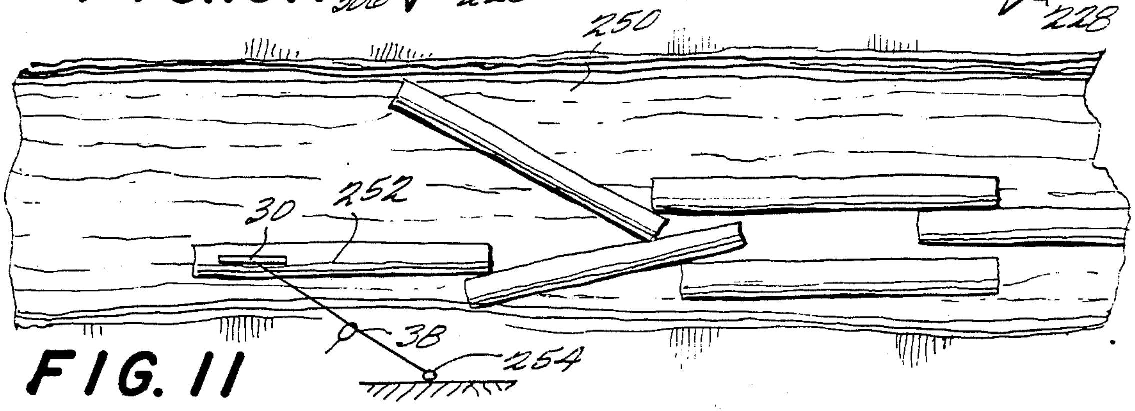
FIG. 11 shows a second embodiment of the present invention as used in logging operations.

Another application of the clamping device described herein is in logging operations. FIG. 11 shows a plurality of logs floating down river 250. The logs shown in FIG. 11 are in the condition known as "log jam". Typically, to remove a log jam, it is only necessary to remove one log called a "key log". To remove this key log using the present invention, long spiked plate 30 is inserted into log 252. The other plate which can be either long spiked plate 30 or short spiked plate 32 is attached to an immobile object such as a tree 254. Alternatively, cable 253 could be attached directly to tree 254. To remove the key log, means for causing tension 38 is tightened, which thereby pulls key log 252 out of the log jam. This provides advantages over the typical method of removing log jams, as an operator is not required to perform a difficult operation such as attaching a chain or line around the key log.

Figure 12:
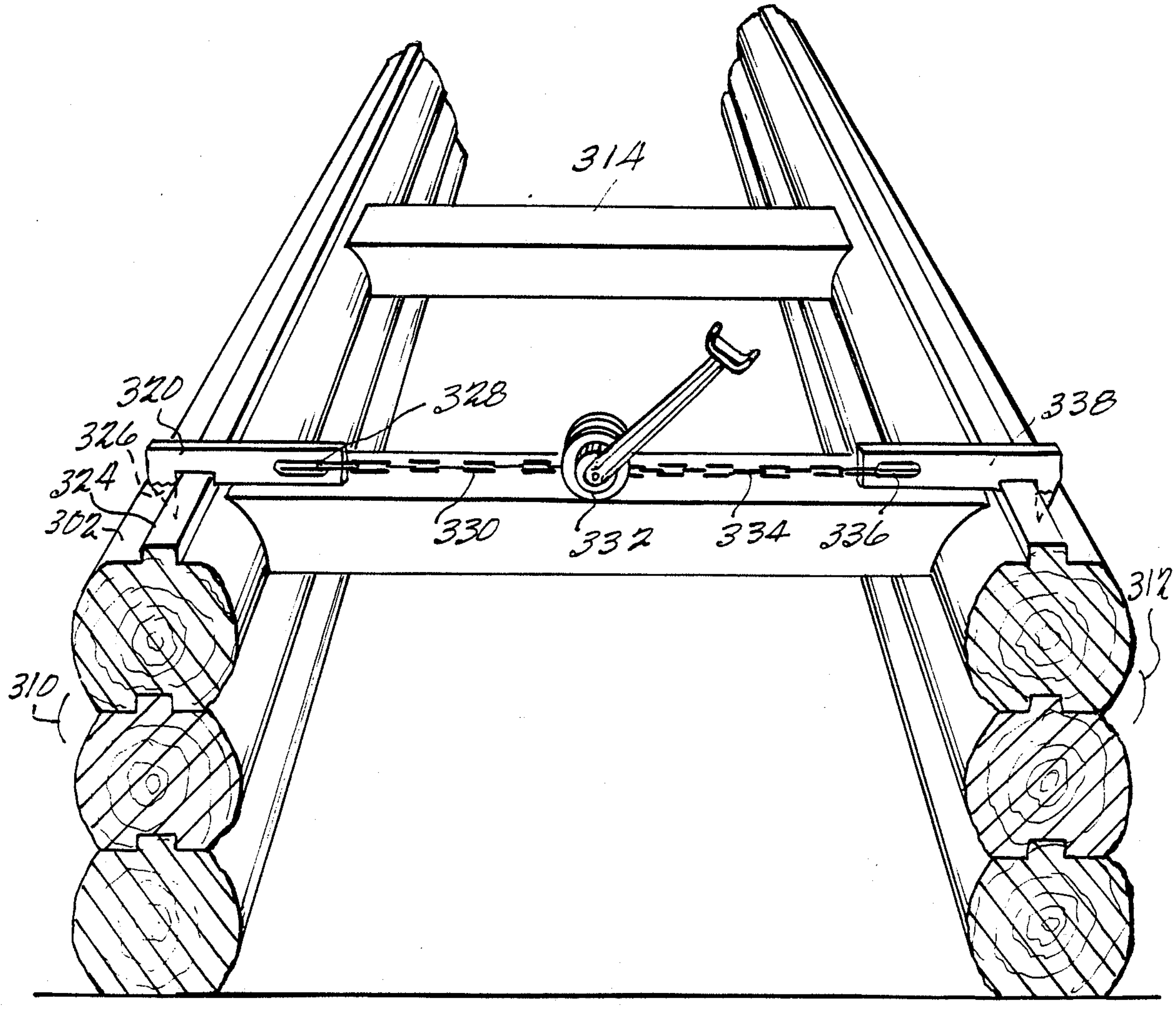
FIG. 12 shows the invention in use in constructing a building.

FIG. 12 shows the invention in use in constructing a building. In the embodiment depicted, the proper dimensioning of wall 310 with respect to wall 312 is crucial. Accordingly, the present invention is used to clamp these two walls tightly to a cross member 314 so that a tight fit can be obtained in building this house. This is especially important when building a pre-cut kit home. The tight fit insures structural integrity of a precut home or any other building being constructed.

In operation, first plate 320 is shown nailed or fixed into top surface 322 of wall 310. Care must be taken that tongue 324 is not nailed into. Accordingly, spike portion 326 of first plate 320 is shown fixed into top surface 322. Force transmitting surface means 328 of first plate 320 is attached to first cable 330 and force applying means 332. The other end of force applying means 332 is affixed to cable 334 which is in turn affixed to force transmitting means 336 of second plate 338. This second plate may be substantially similar to first plate 320, or alternatively may be a different design as discussed above in the specification. Plate 338 is nailed into second wall 312 in a manner similar to the affixation of first plate 320. Accordingly, these two walls are clamped in tight supporting relation to one another, so that they can be permanently anchored into this position. Accordingly, a tighter fit is possible when using the present invention in constructing any such structure.

In addition, the same technique could be applied for selectively removing logs which are located in the river to take to a mill or for other operations. One further advantage of this is that the floating log will normally turn over in such a way that plate 30 is located on the bottom of the log, as the plate would impart an imbalance to the bottom of the log. Thus, when the log was being pulled, the pulled end would tend to rise over other logs and obstructions rather than abutting against them.

In the best mode of using the present invention, the plates are made of heavy soft steel plates which are especially forged to avoid flying fragments emanating therefrom when the plates are struck by a hammer. As has been described throughout the specification, two different kinds of plates are contemplated to be used for different conditions of inserting the plates. The best mode of operation has been described herein including the angles and measurements found by the inventor of the present invention to be the most advantageous possible measurement. It will be appreciated by those skilled in the art that these measurements can be modified.

Although only a few exemplary embodiments of this invention have been described in detail above, those skilled in the art would readily appreciate that many modifications other than those described above are possible in the exemplary embodiments without materially departing from the novel teachings and advantages of this invention. For example, the means for causing tension could be any means therefor including such devices as an engine puller, power winch, or the like. Also, the chains described herein could equally likely be rope, cable or any other such device.

Accordingly, all such modifications are intended to be included within the scope of this invention are defined in the following claims.

What is claimed is:

1. A device for tightening joints such as mitre or a butt joint formed between two relatively large members of wood, such as logs, comprising:

first force transmitting means for engaging one of the members of the joint so as to apply a force thereto in a direction to tighten the joint;

second force transmitting means for engaging with a seond member of the joint so as to apply a force thereto in a direction to tighten the joint; and means connected between said first and second force transmitting means for (1) adjusting the spacing between said first and second force transmitting means when the latter are engaged, respectively, with said two members, and (2) thereafter applying forces thereto which act in a direction tending to move said first and second force transmitting means towards one another, each said force transmitting means comprising: an elongated rigid member having a front end portion, a rear end portion, and an elongated penetrating portion extending away from rear end portion in a direction transverse to the direction of elongature of said rigid member;

said penetraitng portion having:

(1) a sharpened end, and (2) force applying surface means extending from said sharpened end to said rear end portion which faces in a direction towards said front end portion, said rear end portion having: (1) striking surface means facing in a direction opposed to a direction of penetration of said penetraitng portion for receiving hammer blows by which said penetrating portion is caused to penetrate a member; (2) stop surface means facing in a direction toward said pentrating portion, for engaging the member penetrated to limit the penetration of said penetrating portion therein; and (3) lifting surface means facing in the same general direction as said stop surface means and spaced therefrom in a direction away from said penetrating portion for receiving a lever applied force suitable to move said rigid member in a direction opposite to the direction of penetration of said penetrating portion to thereby lift said penetrating portion out of the member, said lifting surface means being defined by a notch in said rear end portion adjacent said penetraitng portion;

said front end portion having: (1) force transmitting surface means for coupling to said force applying means so as to transmit a force applied by said force applying means from said front end portion through said rear end portion to said penetrating portion for application to the member penetrated by the latter through the force applying surface means thereof, and (2) abutment surface means for engaging the member penetrated by said penetrating portion for limiting movement of said front end portion in a direction toward said member as a result of the transmittal of a force through said force transmitting surface means.

2. A device as in claim 1 wherein the penetrating portion of each elongated member includes a surface extending from said sharpened end in increasingly diverging relation with respect to said force applying surface means.

3. A device as in claim 2 wherein said force transmitting surface is within an opening formed within each elongated rigid member in the front end portion thereof.

4. A device as in claim 3 wherein said force applying means includes:

hook means for coupling with said openings in said elongated rigid members, chain means coupled to said hook means for transmitting tension force to said hook means, and turnbuckle means attached to said chain means for varying the length of said chain means, thereby causing tension on said chain means.

5. A device as in claim 1 wherein the sharpened end formed on the penetrating portion of one of said elongated rigid members forms an angle of less than 60° with the stop surface means thereof, thereby causing said one penetrating portion to more firmly enter the associated member of wood when force is applied thereto.

6. A device as in claim 1 wherein said elongated rigid members are both made out of soft heavy steel.

7. A device as in claim 1 wherein each said notch is formed between the associated stop surface means and the associated abutment surface means thereof, each notch being defined by a surface constituting the associated lifting surface means.

8. A device as in claim 7 wherein the stop surface means and the abutment surface means of each elongated member are spaced planar surfaces disposed in the same plane.

9. A device as in claim 1 wherein the penetrating portions of said elongated rigid members have dimenisons measured from the sharpened end thereof to the associated stop surface means which are respectively (1) in the range of 2–4 inches and (2) less than 2 inches.

* * * * *